(No Model.)

J. B. ELLIOTT.
FIRE WHEEL FOR BICYCLE PERFORMANCES.

No. 288,413. Patented Nov. 13, 1883.

WITNESSES:

INVENTOR:
J. B. Elliott
BY Munn & Co.
ATTORNEYS.

United States Patent Office.

JAMES B. ELLIOTT, OF LONDON, ENGLAND.

FIRE-WHEEL FOR BICYCLE PERFORMANCES.

SPECIFICATION forming part of Letters Patent No. 288,413, dated November 13, 1883.

Application filed April 3, 1883. (No model.)

*To all whom it may concern:*

Be it known that I, JAMES B. ELLIOTT, of London, England, have invented a new and Improved Fire-Wheel for Bicycle Performances, of which the following is a full, clear, and exact description.

The object of my invention is to provide a new and improved wheel for supporting a bicycle during performances on the same.

The invention consists in a wheel adapted to support a bicycle, which wheel is provided in the edges or sides of the felly with one or more grooves for receiving fire-works, which are to be ignited when the wheel is being revolved by the wheel of the bicycle placed on it. The wheel of the bicycle rests against a flanged spool mounted to revolve and slide on a transverse rod held a short distance from the outer surface of the felly, which rod prevents the bicycle from running off the wheel.

Reference is to be had to the accompanying drawings, forming part of this specification, in which similar letters of reference indicate corresponding parts in both figures.

Figure 1:
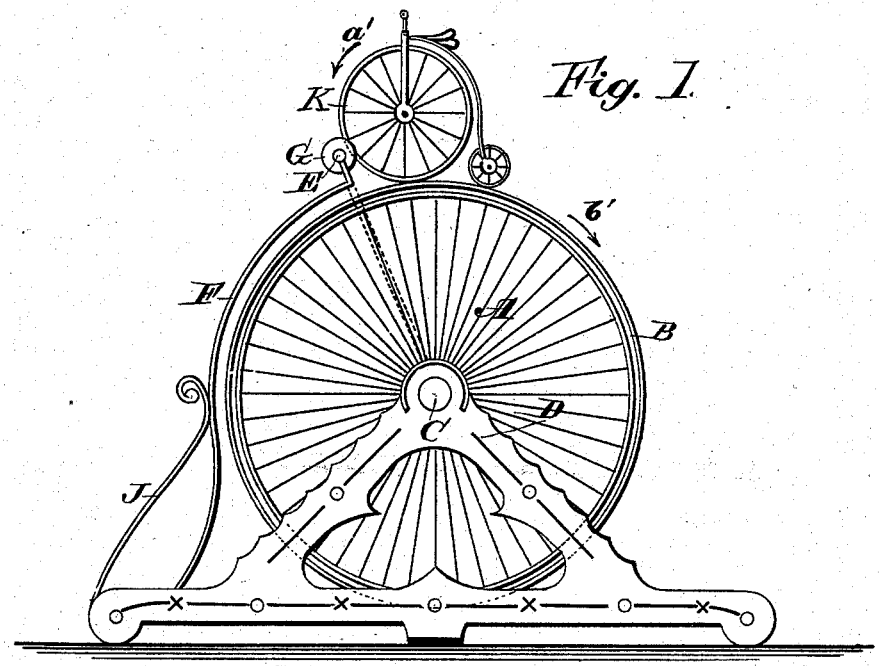
Figure 2:
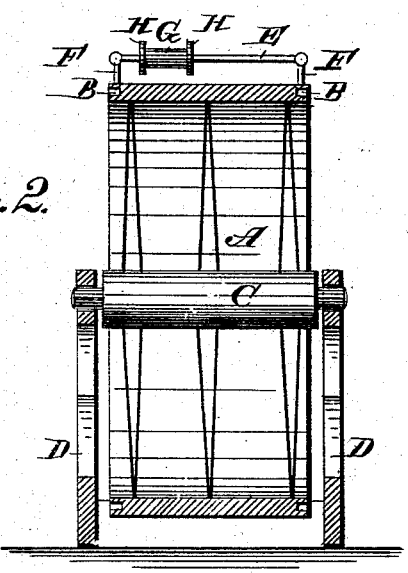

Figure 1 is a longitudinal elevation of my improved fire-wheel for bicycle performances. Fig. 2 is a cross-sectional elevation of the same.

A wheel, A, is constructed with a wide felly which measures about six to fourteen inches across, and in each edge the felly is provided with an annular groove, B, about one inch in depth, more or less. The groove is preferably lined with metal or made in metal. The outer surface of the felly is to be covered with emery-cloth, leather, or other suitable material, to increase the friction.

The axle C of the wheel is journaled in ball-bearings in a suitable frame, D.

A transverse rod, E, is held in a suitable standard, F, in such a manner that the said rod will be a short distance from the outer surface of the felly and a certain distance to one side of the highest point of the wheel. A spool, G, is mounted on the rod E in such a manner that it can revolve on the same and slide longitudinally on the same very freely. The spool is provided at each end with an annular flange, H. The standard F is braced by means of a brace, J, from the base, and, if desired, by braces (shown in dotted lines) from the frame D. The wheel A is preferably from four to five feet in diameter.

The bicycle is placed on the wheel A in such a manner that the felly of the wheel K of the bicycle will rest against the spool G and will be between the end flanges, H. If the bicycle-wheel K is revolved in the direction of the arrow $a'$, the wheel $b'$ will be revolved in the direction of the arrow $b'$ by the wheel K. The spool G, held on the rod E, prevents the bicycle from running off the wheel A. The bicycle will move transversely more or less on the outer surface of the wheel A, and the spool G will slide with it, so that the edge of the wheel K will always rest against the spool. Fire-works are placed in the grooves B in the felly of the wheel A, and are ignited while the wheel A is revolving, thereby producing very novel and handsome effects.

If desired, the wheel A can be provided with more than one groove B in its felly.

Having thus described my invention, I claim as new and desire to secure by Letters Patent—

1. A wheel for bicycle performances, consisting of a wheel provided with a groove or grooves in the sides of the fellies, which grooves are adapted to receive fire-works, substantially as herein shown and described, and for the purposes set forth.

2. The combination, with a wheel for supporting a bicycle, of devices for preventing the bicycle from running off the wheel, substantially as herein shown and described, and for the purpose set forth.

3. The combination, with a wheel for supporting a bicycle, of a transverse rod and a spool on the said rod, against which spool the felly of the bicycle-wheel is to rest to prevent it from running off the wheel, substantially as herein shown and described, and for the purpose set forth.

4. The combination, with the wheel A, of the rod E and the spool G, provided with annular end flanges, H, which spool is adapted to slide and rotate on the rod E, substantially as herein shown and described, and for the purpose set forth.

JAMES B. ELLIOTT.

Witnesses:
  OSCAR F. GUNZ,
  C. SEDGWICK.